United States Patent
Fukuda et al.

(10) Patent No.: US 8,767,146 B2
(45) Date of Patent: *Jul. 1, 2014

(54) DISPLAY DEVICE

(71) Applicants: Japan Display Inc., Tokyo (JP); Panasonic Liquid Crystal Display Co., Ltd., Hyogo-ken (JP)

(72) Inventors: Koichi Fukuda, Mobara (JP); Tetsuya Oshima, Mobara (JP); Satoru Kawasaki, Mobara (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,561

(22) Filed: Apr. 25, 2013

(65) Prior Publication Data

US 2013/0235308 A1 Sep. 12, 2013

Related U.S. Application Data

(63) Continuation of application No. 12/565,885, filed on Sep. 24, 2009, now Pat. No. 8,451,404.

(30) Foreign Application Priority Data

Sep. 24, 2008 (JP) .................... 2008-244262

(51) Int. Cl.
G02F 1/1335 (2006.01)
(52) U.S. Cl.
USPC ............................. 349/96; 349/117

(58) Field of Classification Search
USPC .................................................... 349/96, 117
See application file for complete search history.

(56) References Cited

U.S. PATENT DOCUMENTS

2006/0164579 A1 7/2006 Yano
2008/0252827 A1* 10/2008 Hirai et al. ...................... 349/96
2010/0002171 A1 1/2010 Yoshimi

FOREIGN PATENT DOCUMENTS

| JP | 9-325216 | 12/1997 |
| JP | 2003-207620 | 7/2003 |
| JP | 2007-65191 | 3/2007 |
| WO | WO 2008044422 | 4/2008 |

* cited by examiner

*Primary Examiner* — Michael Caley
(74) *Attorney, Agent, or Firm* — Antonelli, Terry, Stout & Kraus, LLP.

(57) ABSTRACT

A display device is provided which includes a lower substrate and an upper substrate. An inner surface of the lower substrate and an inner surface of the upper surface face each other. A polarizing plate is disposed on an outer surface of the upper substrate, wherein the polarizing plate includes at least an inside protective film, a polarizing film and an outside protective film, which are layered on the upper substrate side in this order so that the inside protective film is adjacent to the upper substrate. An expansion axis of the outside protective film forms an angle of 30° or more and 90° or less with an expansion axis of the polarizing film, and an expansion axis of the inside protective film forms an angle of 0° or more and 3° or less with an expansion axis of the polarizing film.

4 Claims, 3 Drawing Sheets

DISPLAY DEVICE

CROSS-REFERENCE TO RELATED APPLICATION

This application is a continuation of U.S. application Ser. No. 12/565,885, filed Sep. 24, 2009, the contents of which are incorporated herein by reference.

The present application claims priority over Japanese Application JP 2008-244262 filed on Sep. 24, 2008, the contents of which are hereby incorporated into this application by reference.

BACKGROUND OF THE INVENTION (1) Field of the Invention

The present invention relates to a display device, and in particular, a display device having a polarizing plate.

(2) Description of the Related Art

Liquid crystal display devices (panels) are formed of a pair of substrates provided so as to face each other and sandwich liquid crystal, and polarizing plates pasted to the respective substrates on the side opposite to the liquid crystal. An amount of light that transmits through the polarizing plates can be changed for the display by controlling the molecules of the liquid crystal by means of an electrical field. The polarizing plates are usually provided so that the respective absorption axes cross at a right angle.

In this case, the respective polarizing plates are formed by layering at least a protective film (hereinafter referred to as an inside protective film), a polarizing film (also referred to as polarizer or polarizer layer), and a protective film (hereinafter referred to as outside protective film) on the above described substrate. The polarizing film in itself has polarizing properties, and when an inside protective film and an outside protective film are provided, the durability of the polarizing film and the resistance against scratching are higher.

FIG. 2 is an exploded perspective diagram showing a polarizing plate (hereinafter referred to as upper side polarizing plate) POL2 pasted to the surface of a conventional liquid crystal display panel PNL on the viewer side and a polarizing plate (hereinafter referred to as lower side polarizing plate) POL1 pasted to the surface on the side opposite to the viewer. The upper side polarizing plate POL2 is pasted to the liquid crystal display panel PNL and formed by layering an inside protective film PSI2, a polarizing film PLF2 and an outside protective film PSO2 with adhesive layers (not shown) in between on the liquid crystal display panel PNL. Likewise, the lower side polarizing plate POL1 is pasted to the liquid crystal display panel PNL and formed by layering an inside protective film PSI1, a polarizing film PLF1 and an outside protective film PSO1 with adhesive layers (not shown) in between on the liquid crystal display panel PNL. In this case, the respective expansion axes EA of the inside protective film PSI2 and the outside protective film PSO2 are directed in the direction of the expansion axis EA of the polarizing film PLF2 (all the axes are directed in the same direction) in the upper side polarizing plate POL2 while the respective expansion axes EA of the inside protective film PSI1 and the outside protective film PSO1 are directed in the direction of the expansion axis EA of the polarizing film PLF1 (all the axes are directed in the same direction) in the lower side polarizing plate POL1. The configuration shown in FIG. 3, for example, is known as a configuration of a conventional polarizing plate other than that in FIG. 2 (see JP 2007-65191A). FIG. 3 corresponds to FIG. 2.

In FIG. 3, the configuration is different from that in FIG. 2 in that the inside protective film of the upper side polarizing plate POL2 is arranged so that the expansion axis EA of the inside protective film crosses the expansion axis EA of the polarizing film PLF2 in the upper side polarizing plate POL2 at an angle of 45° or 135° while the inside protective film of the lower side polarizing plate POL1 is arranged so that the expansion axis EA of the inside protective film crosses the expansion axis EA of the polarizing film in the lower polarizing plate POL1 at an angle of 45° or 135° (see θ2 in FIG. 3). Though JP 2007-651919A does not directly describe this, the respective expansion axes of the polarizing film (polarizer layer) and the inside protective layer can be interpreted so as to cross at an angle of 45° or 135° from the description that the protective layer (inside protective layer) of the polarizing film on the liquid crystal display panel side is provided with birefringence so as to optically function.

Here, FIGS. 2 and 3 correspond to FIG. 1 showing the configuration according to an embodiment of the present invention. Therefore, the above description merely relates to the disadvantages in the configurations shown in FIGS. 2 and 3, and the other parts of the configuration are described in detail in reference to FIG. 1.

The documents that relate to the present invention in addition to the prior art shown in FIG. 3 are JP 2003-207620A and JP 1997-325216A, for example.

JP 2003-207620A describes that a transparent protective film is formed on at least one side of a polarizing film, and the slow axis of the above described transparent protective film and the absorption axis of the above described polarizing film form an angle of 10° or greater and less than 90°. Here, in the case where transparent protective films are provided on both sides of the polarizing film, the slow axis of the outside protective film and the slow axis of the inside protective film are assumed to be in the same direction.

JP 1997-325216A describes a liquid crystal display device in which transparent protective films are provided on both sides of a polarizing film, the transparent protective film formed on one side of the polarizing film exhibits birefringence with an in-plane phase difference 50 nm to 200 nm, and the slow axis of the transparent protective film having this birefringence is parallel or perpendicular to the transmission axis of the polarizing film. Here, the slow axis of the outside protective film and the slow axis of the inside protective film are in the same direction.

SUMMARY OF THE INVENTION

In the case of the configuration shown in FIG. 2, however, the respective expansion axes EA of the inside protective film PSI2, the polarizing film PLF2 and the outside protective film PSO2 are all directed in the same direction in the upper side polarizing plate POL2 before being pasted to the liquid crystal display panel PNL, and therefore, such a problem arises that upper side polarizing plate POL2 easily splits in the direction of the expansion axes EA. The same is true for the lower side polarizing plate POL1.

In addition, in the liquid crystal display devices shown in FIG. 3 and disclosed in JP2007-65191A, the inside protective film PSI2 of the upper side polarizing plate POL2, for example, firmly adheres to the liquid crystal display panel PNL while the polarizing film PLF2 adheres more weakly to the liquid crystal display panel PNL and the outside protective film PSO2 adheres to the liquid crystal display panel PNL even more weakly. In this case, the inside protective film PSI2, the polarizing film PLF2 and the outside protective film PSO2 are all formed by being expanded, and therefore, a shrinking force is applied in the direction opposite to the direction in which they are expanded, and the polarizing film PLF2 and the outside protective film PSO2, which do not adhere firmly to the liquid crystal display panel PNL, easily change form on the liquid crystal display panel PNL. The polarizing film PLF2 and the outside protective film PSO2 are expanded in the same direction, and therefore, they both have weak resistance against their shrinking force, and thus, they change form relatively greatly. Therefore, this shrinking force causes such a problem that the polarizing film PLF2 and the outside protective film PSO2 easily split. This is also true for the lower side polarizing plate POL1, and the polarizing film PLF1 and the outside protective film PSO1 also change form relatively greatly on the liquid crystal display panel PNL, and thus, the shrinking force causes such a problem that the polarizing film PLF1 and the outside protective film PSO1 easily split. As a result, there is a problem where the upper side polarizing plate POL2 and the lower side polarizing plate POL1 do not have sufficient optical reliability as polarizing plates.

Furthermore, in JP 2003-207620A and JP 1997-325216A, the expansion axis of the inside protective film is in a different direction from the expansion axis of the polarizing film, and therefore, there is a problem where the films are easily and negatively affected optically.

An object of the present invention is to provide a liquid crystal display device having optical reliability by reducing changes in the form of the polarizing plates.

The above described object is achieved in the display device according to the present invention by directing the expansion axis of the inside protective film and the outside protective film that form a polarizing plate in a predetermined direction relative to the direction of the expansion axis of the polarizing film (polarizer layer).

Here, the polarizing film, the inside protective film and the outside protective film are all usually manufactured by expanding in the direction in which the film runs continuously (in the longitudinal direction). Therefore, an expansion axis can be defined for the polarizing film, the inside protective film and the outside protective film such that the expansion axis coincides with the direction in which each film is expanded, and in the following description, this is referred to as expansion axis. In the case of a polarizing film, the expansion axis is the same as the absorption axis. In the case of an inside protective film or an outside protective film, the expansion axis is the same as a slow axis when there is a phase difference, and there is no such slow axis but there is an expanded axis when there is no phase difference.

The present invention can provide, for example, configurations as follows.

(1) The display device having a pair of substrates provided so as to face each other and sandwich liquid crystal, and polarizing plates which are pasted to surfaces of the above described pair of substrates on the sides opposite to the above described liquid crystal, and the above described polarizing plates are formed of at least an inside protective film, a polarizing film and an outside protective film, which are layered on the above described substrate side in this order, an expansion axis of the above described outside protective films forms an angle of 30° or more and 90° or less with an expansion axis of the above described polarizing films, and an expansion axis of the above described inside protective films forms an angle of 0° or more and 3° or less with an expansion axis of the above described polarizing films.

(2) The display device in (1), the expansion axis of the inside protective films forms an angle of 0° or more and 1° or less with the expansion axis of the polarizing films.

(3) The display device in (1), outside protective film is made of a film having a polyester resin as a main component.

(4) The display device in (1), a phase difference film forms a layer between the substrates and inside protective films.

(5) The display device having a substrate on which light emitting elements are arranged in a matrix and a polarizing plate which is pasted to a surface of the substrate on the side closer to the viewer than the substrate and the light emitting elements, and the polarizing plate is formed of at least an inside protective film, a polarizing film and an outside protective film, which are layered on the substrate side in this order, an expansion axis of the outside protective film forms an angle of 30° or more and 90° or less with an expansion axis of the polarizing film, and an expansion axis of the inside protective film forms an angle of 0° or more and 3° or less with an expansion axis of the polarizing film. (6) The display device in (5), expansion axis of the inside protective films forms an angle of 0° or more and 1° or less with the expansion axis of the polarizing films.

(7) The display device in (5), the outside protective film is made of a film having a polyester resin as a main component.

(8) The display device in (5), a phase difference film forms a layer between the substrates and the inside protective films.

Here, the above described configurations are merely examples, and appropriate modifications are possible, as long as the technological idea of the present invention is not deviated from. In addition, examples of the configuration of the present invention other than those described above will become clearer from the entirety of the description in the present specification and the drawings.

These liquid crystal display devices have less change in the form of the polarizing plates and are optically reliable.

Other merits of the present invention will become clearer from the entirety of the description in the specification.

DESCRIPTION OF THE PREFERRED EMBODIMENTS

The embodiments of the present invention are described in reference to the drawings.

First Embodiment

Figure 1:
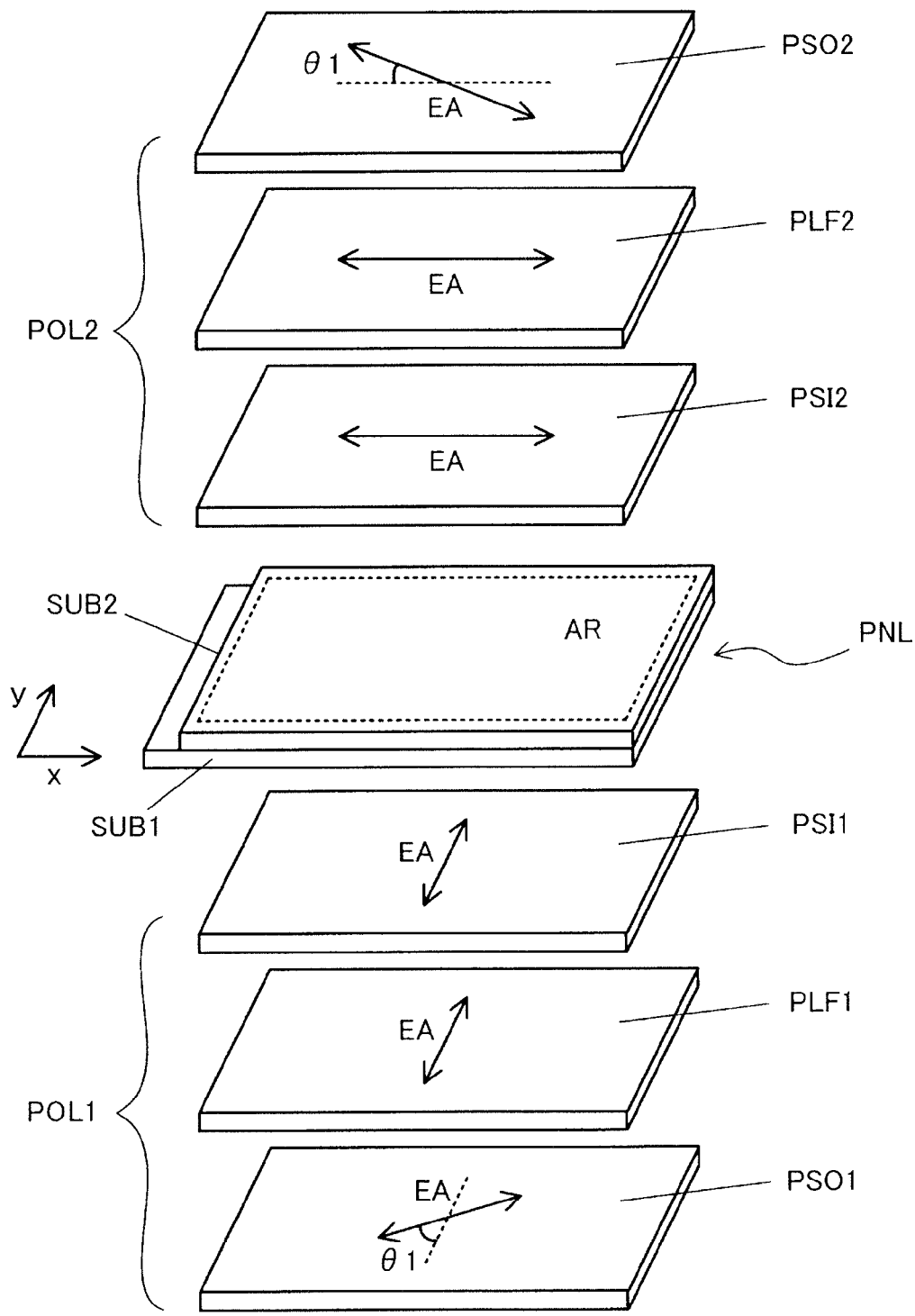
FIG. 1 is the display device according to one embodiment of the present invention.
Figure 2:
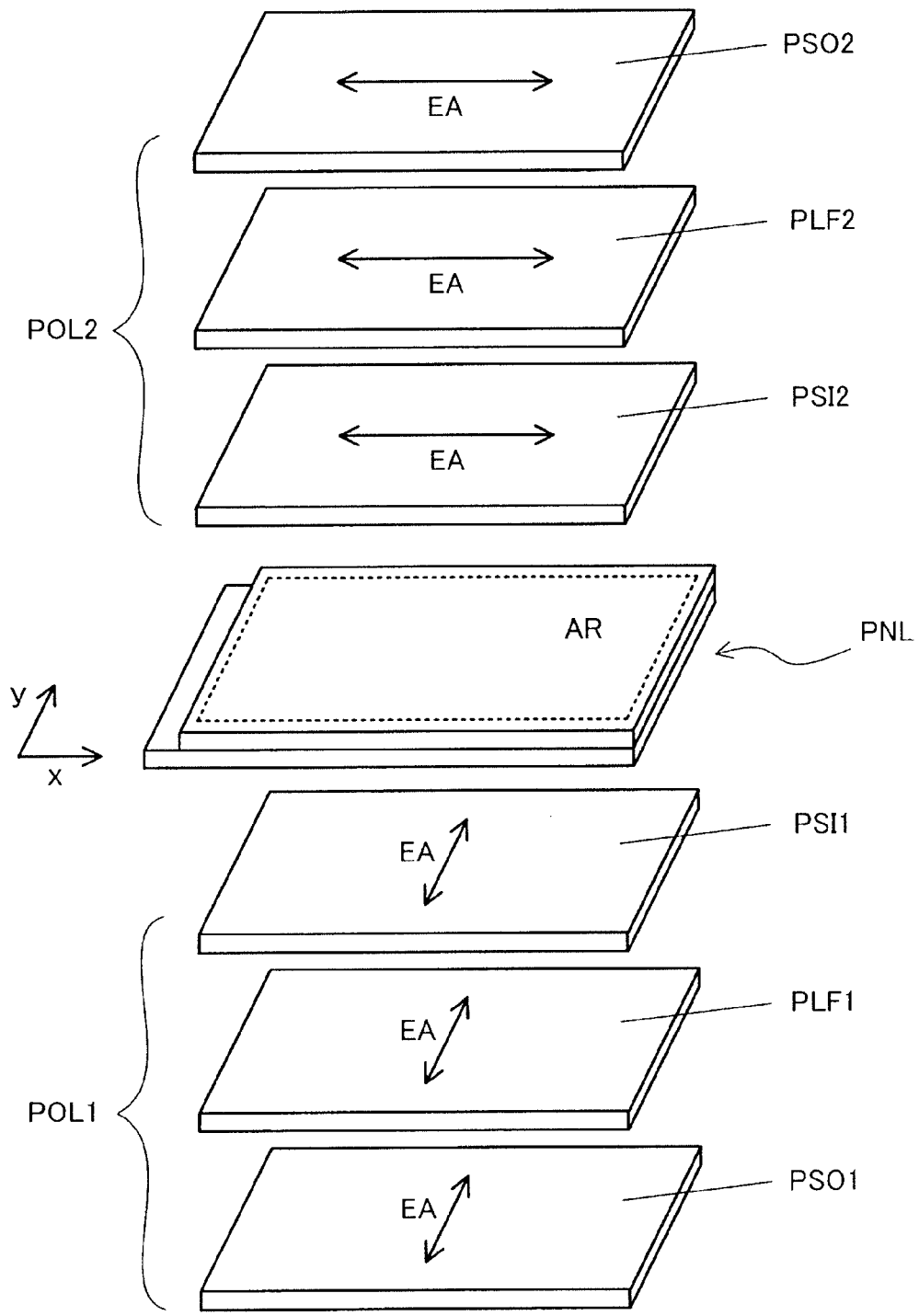
FIG. 2 is an example of a conventional display device.
Figure 3:
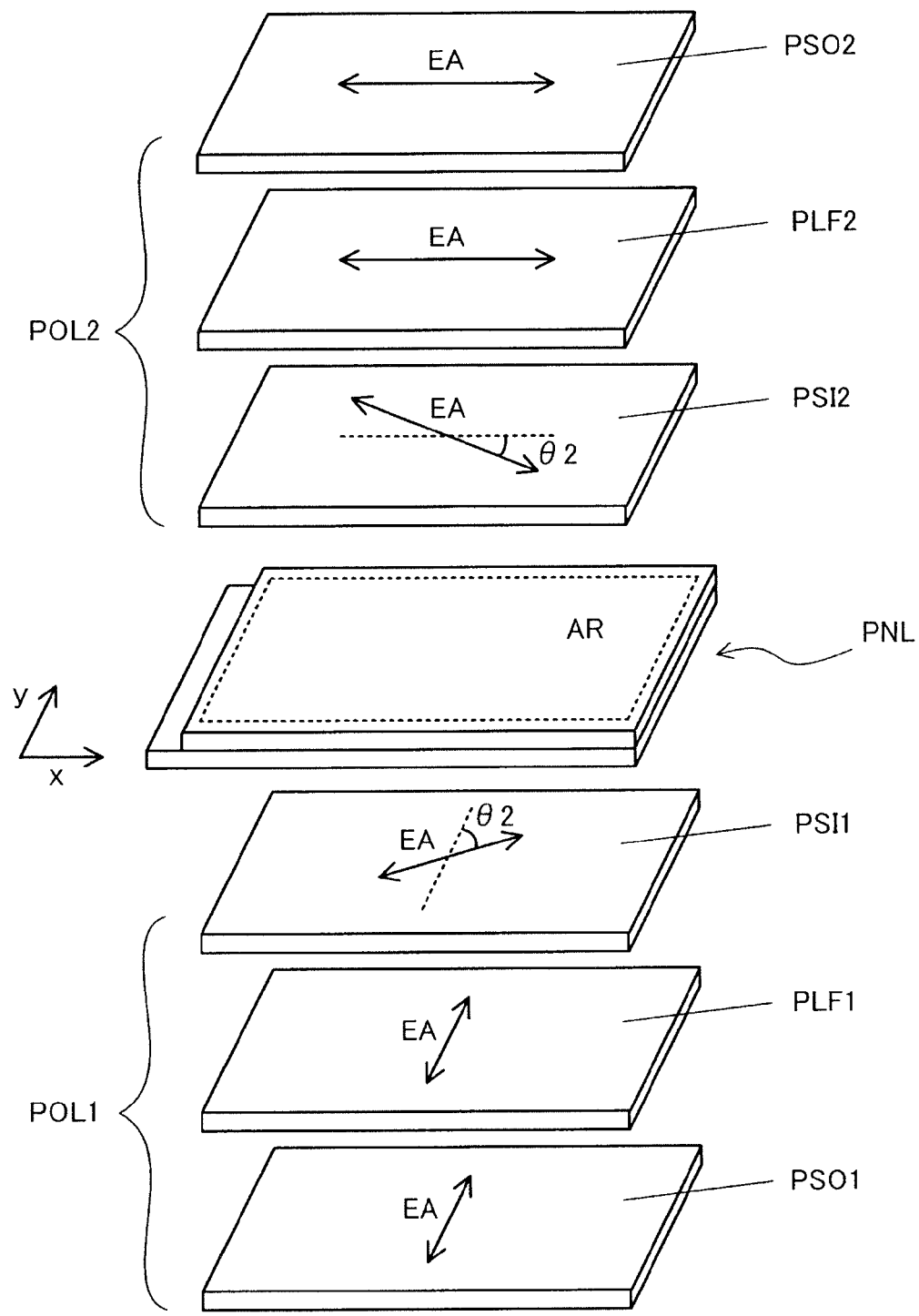
FIG. 3 is another example of a conventional display device.

FIG. 1 is an exploded perspective diagram showing the liquid crystal display device (panel) according to one embodiment of the present invention.

A liquid crystal display panel PNL is provided with substrates SUB1 and SUB2 made of glass, for example, and these substrates SUB1 and SUB2 are provided so as to face each other and sandwich liquid crystal. The substrate SUB2 is secured to the substrate SUB1 by means of a sealing material (not shown), and the region where the liquid crystal is sealed using the sealing material is provided as a display region AR in the configuration. In addition, though not shown, a number of pixels are formed and arranged in a matrix in the display region AR on the surface of the substrates SUB1 and SUB2 on the liquid crystal side, and these pixels independently generate an electrical field, so that the molecules of the liquid crystal in the pixels can be driven by this electrical field.

Liquid crystal display panels PNL are usually referred to as liquid crystal display panel PNL in a state where the below described upper side polarizing plate POL2 and lower side polarizing plate POL1 are pasted to the panel. In the following description, however, panels to which no upper side polarizing plate POL2 or lower side polarizing plate POL1 is pasted may also be referred to as liquid crystal display panel PNL.

An upper side polarizing plate POL2 is pasted to the surface of the substrate SUB2 on the side opposite to the liquid crystal using an adhesive layer or tackifier layer (not shown) so as to cover at least the display region AR. The polarization of light that passes through the polarizing plate POL1 can be controlled by the liquid crystal, by controlling the molecules of the liquid crystal by means of an electrical field, and thus, the amount of light that transmits through the polarizing plate POL2 can be changed for display.

The upper side polarizing plate POL2 is formed of an inside protective film PSI2, a polarizing film PLF2 and an outside protective film PSO2, which are layered on the above described substrate SUB2 side in this order. Adhesive layers (not shown) intervene between the inside protective film PSI2 and the polarizing film PLF2, as well as between the polarizing film PLF2 and the outside protective film PSO2. The inside protective film PSI2 and the outside protective film PSO2 are provided on either side of the polarizing film PLF2 having polarizing properties, and thus, the durability of the polarizing film PLF2 and the resistance against scratching are higher.

Here, the polarizing film PLF2 is provided so that the expansion axis EA is directed in the direction of the long side of the liquid crystal display panel PNL (direction x in the figure), for example (this is merely an example, and the direction is not limited to that of the long side). The expansion axis EA of the inside protective film PSI2 is directed in approximately the same direction as that of the polarizing film PLF2, that is to say, in the direction of the long side of the liquid crystal display panel PNL (direction x in the figure), for example. In this case, the expansion axis EA of the inside protective film PSI2 may be directed so as to form an angle of 0° C. or more and 3° or less (desirably 0° or more and 1° or less) with the direction of the expansion axis EA of the polarizing film PLF2, taking error into consideration. In contrast, the outside protective film PSO2 is provided so that the expansion axis EA is directed so as to form an angle θ1 of 30° or more and 90° or less with the direction of the expansion axis EA of the polarizing film PLF2.

A lower side polarizing plate POL1 is pasted to the surface of the substrate SUB1 on the side opposite to the liquid crystal using an adhesive layer or tackifier layer (not shown), so as to cover at least the display region AR.

The lower side polarizing plate POL1 is formed of an inside protective film PSI1, a polarizing film PLF1 and an outside protective film PSO1, which are layered on the above described substrate SUB1 side in this order. Adhesive layers (not shown) intervene between the inside protective film PSI1 and the polarizing film PLF1, as well as between the polarizing film PLF1 and the outside protective film PSO1. The inside protective film PSI1 and the outside protective film PSO1 are provided on either side of the polarizing film PLF1 having polarizing properties, and thus, the durability of the polarizing film PLF1 and the resistance against scratching are higher.

Here, the polarizing film PLF1 is provided so that the expansion axis EA is directed in the direction of the short side of the liquid crystal display panel PNL (direction y in the figure), for example (this is merely an example, and the direction is not limited to the direction of the short side). The inside protective film PSI1 is provided so that the expansion axis EA is directed in approximately the same direction as that of the polarizing film PLF1, that is to say, in the direction of the short side of the liquid crystal display panel PNL (direction y in the figure), for example. In this case, the expansion axis EA of the inside protective film PSI1 may be directed so as to form an angle of 0° or more and 3° or less (desirably 0° or more and 1° or less) with the direction of the expansion axis EA of the polarizing film PLF1, taking error into consideration. In contrast, the outside protective film PSO1 is provided so that the expansion axis EA is directed so as to form an angle θ1 of 30° or more and 90° or less with the direction of the expansion axis EA of the polarizing film PLF1.

In the thus formed liquid crystal display device, the inside protective film PSI2 firmly adheres to the liquid crystal display panel PNL in the upper side polarizing plate POL2, for example, while the polarizing film PLF2 adheres more weakly to the liquid crystal display panel PNL and the outside protective film PSO2 adheres to the liquid crystal display panel PNL even more weakly. In this case, a shrinking force in the direction opposite to the direction of the expansion axis EA is applied to the inside protective film PSI2, the polarizing film PLF2 and the outside protective film PSO2. However, the inside protective film PSI2 does not easily change in form, due to its strong adhesion to the liquid crystal display panel PNL. In addition, the expansion axis EA of the polarizing film PLF2 is directed differently from the direction of the expansion axis EA of the outside protective film PSO2 in the upper layer, and therefore, a strong resistance force resulting from the outside protective film PSO2 is applied against the shrinking force, which makes it difficult for the polarizing film PLF2 to change in form to such a degree as to sufficiently make up for the weakness in its adhesion to the liquid crystal display panel PNL. Likewise, the expansion axis EA of the outside polarizing film PSO2 is directed differently from the direction of the expansion axis EA of the polarizing film PLF2 in the lower layer, and therefore, a strong resistance resulting from the polarizing film PLF2 is applied the shrinking force, which makes it difficult for the outside polarizing film PSO2 to change in form to such a degree as to sufficiently make up for the weakness in its adhesion to the liquid crystal display panel PNL. Accordingly, the shrinking force can solve the problem with the polarizing film PLF2 and the outside protective film PSO2 being easy to tear.

The same holds for the lower side polarizing plate POL1, and the inside protective film PSI1, the polarizing film PLF1 and the outside protective film PSO1 are formed on the liquid crystal display panel PNL so that they do not easily change in form. As a result, the upper side polarizing plate POL2 and the lower side polarizing plate POL1 are formed as polarizing plates with sufficient optical reliability.

Furthermore, the expansion axis EA of the inside protective film PSI2 on the liquid crystal layer side of the polarizing film PLF2 approximately coincides with the expansion axis EA of the polarizing film PLF2, and therefore, the problem with the inside protective film having negative optical effects on the polarizing film can be solved. The same holds for the inside protective film PSI1.

Here, the polarizing film PLF2 on the upper side polarizing plate POL2 and the polarizing film PLF1 on the lower side polarizing plate POL1 are formed by expanding a polyvinyl alcohol (PVA) sheet and then dying it with iodine or a dichromatic dye, or dying the sheet and then expanding it, and further cross-linking the sheet with a boron compound. In addition, expanded sheets of triacetyl cellulose (TAC), for example, are used for the inside protective film PSI2 and the outside protective film PSO2 on the upper side polarizing plate POL2, as well as for the inside protective film PSI1 and the outside protective film PSO1 on the lower side polarizing plate POL1.

Second Embodiment

In the liquid crystal display device according to the first embodiment, the material for the outside protective film PSO2 on the upper side polarizing plate POL2 and the outside protective film PSO1 on the lower side polarizing plate POL1 is triacetyl cellulose (TAC).

However, the outside protective film PSO2 on the upper side polarizing plate POL2 and the outside protective film PSO1 on the lower side polarizing plate POL1 may be formed of a film having a polyester resin as a main component. Polyester resins include polyethylene terephthalate (PET), polybutylene terephthalate (PBT), polybutylene naphthalate (PBN), and polyester copolymers having these as a main component, for example.

In the case where triacetyl cellulose (TAC) is used for the outside protective films PSO in the liquid crystal display device according to the first embodiment, it can be confirmed that the polarizing films PLF shrink more easily than the outside protective films PSO, due to the difference in material. Therefore, the degree of deformation of the polarizing films PLF relative to the outside protective films PSO can be reduced, and thus, excellent optical properties can be gained.

In this case, it is preferable for the outside protective films PSO made of a film having a polyester resin as a main component to have an average tensile strength of 150 MPa (desirably 170 MPa or higher) in the direction of the expansion axis EA and a direction perpendicular to the expansion axis EA. In addition, it is preferable for outside protective films PSO made of a film having a polyester resin as a main component to have a moisture permeability of 300 g/m2/24 hr or less (desirably 100 g/m2/24 hr or less). In addition, it is preferable for outside protective films PSO made of a film having a polyester resin as a main component to have an average shrinking ratio of 2.5% or less (desirably 1.0% or less) after 50 minute test a 150° C. in the direction of the expansion axis EA and a direction perpendicular to the expansion axis EA. In addition, it is preferable for the outside protective films PSO made of a film having a polyester resin as a main component to have a film thickness of 10 µm to 100 µm, from the point of view of ease of handling and processability. Furthermore, it is preferable for it to be 10 µm to 40 µm, from the point of view of transparency and reduction in the thickness of the film. Furthermore, it is preferable for outside protective films PSO made of a film having a polyester resin as a main component to have a transmittance of 80% or more (desirably 90% or more) for light of every sort.

Though in the above, a film having a polyester resin as a main component is used for the outside protective films PSO, it may, or course, also be used for the inside protective films PSI.

Third Embodiment

In the liquid crystal display device according to the first embodiment, the upper side polarizing plate POL2 and the lower side polarizing plate POL1 are formed of an inside protective film PSI, a polarizing film PLF and an outside protective film PSO. However, at least the upper side polarizing plate POL2 or the lower side polarizing plate POL1 may be formed so that a phase difference film forms a layer between the liquid crystal display panel PNL (substrate SUB1 or SUB2) and the inside protective film PSI. That is to say, the polarizing plate POL1 or the polarizing plate POL2 may be pasted to the liquid crystal display panel PNL with a phase difference film in between.

Fourth Embodiment

Though in the liquid crystal display device according to the first embodiment, the outside protective films PSO form the uppermost layer of the upper side polarizing plate POL2 and the lower side polarizing plate POL1 (as viewed from the liquid crystal display panel PNL side), a hard coat layer, an antiglare layer, an antireflection layer, a conductive layer or an antistatic layer may be formed on top.

Fifth Embodiment

The above described embodiments are examples of a liquid crystal display device. However, the invention can be applied to other display devices, such as organic EL display devices. Organic EL display devices are display devices where light emitting elements made of organic EL elements are arranged on the surface of a substrate in a matrix, and these light emitting elements can be controlled independently to display images. In this case, a polarizing plate is pasted to the surface of the substrate on the viewer side of the substrate and the light emitting elements, and display devices where such a polarizing plate prevents light from being reflected are known. In addition, a plate where at least an inside protective film, a polarizing film and an outside protective film are layered on the substrate side can be used as the polarizing plate. Therefore, these organic EL display devices also have the same problems as those described above, and the present invention can be applied as it is.

Though the present invention is described using embodiments, the configurations in these embodiments are merely examples, and appropriate modifications are possible, as long as the technological idea of the present invention is not deviated from. In addition, the configurations in the respective embodiments may be combined for use, as long as they are not inconsistent.

What is claimed is:
1. A display device comprising:
a lower substrate and an upper substrate, wherein an inner surface of the lower substrate and an inner surface of the upper surface face each other, and
a polarizing plate disposed on an outer surface of the upper substrate, wherein the polarizing plate is comprised of at least an inside protective film, a polarizing film and an outside protective film, which are layered on the upper substrate side in this order so that the inside protective film is adjacent to the upper substrate, an expansion axis of the outside protective film forms an angle of 30° or more and 90° or less with an expansion axis of the polarizing film, and an expansion axis of the inside protective film forms an angle of 0° or more and 3° or less with an expansion axis of the polarizing film.
2. The display device according to claim 1, wherein the expansion axis of the inside protective films forms an angle of 0° or more and 1° or less with the expansion axis of said polarizing films.
3. The display device according to claim 1, wherein the outside protective film is comprised of a film having a polyester resin as a main component.

4. The display device according to claim 1, wherein a phase difference film forms a layer between the upper substrate and the inside protective films.

* * * * *